United States Patent
Spatz et al.

(10) Patent No.: US 9,352,278 B2
(45) Date of Patent: May 31, 2016

(54) SUBSTRATE SURFACE STRUCTURED WITH THERMALLY STABLE METAL ALLOY NANOPARTICLES, A METHOD FOR PREPARING THE SAME AND USES THEREOF, IN PARTICULAR AS A CATALYST

(75) Inventors: Joachim P. Spatz, Stuttgart (DE); Sebastian Lechner, Aachen (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 76 days.

(21) Appl. No.: 14/235,442

(22) PCT Filed: Jul. 27, 2012

(86) PCT No.: PCT/EP2012/003210
§ 371 (c)(1),
(2), (4) Date: Jan. 30, 2014

(87) PCT Pub. No.: WO2013/013831
PCT Pub. Date: Jan. 31, 2013

(65) Prior Publication Data
US 2014/0193745 A1   Jul. 10, 2014

(30) Foreign Application Priority Data
Jul. 27, 2011   (EP) .................................... 11006196

(51) Int. Cl.
*H01M 4/86* (2006.01)
*H01M 4/88* (2006.01)
(Continued)

(52) U.S. Cl.
CPC .................. *B01D 53/94* (2013.01); *B01J 23/38* (2013.01); *B01J 23/464* (2013.01); *B01J 23/52* (2013.01);
(Continued)

(58) Field of Classification Search
CPC ............ H01M 4/8803; H01M 4/8842; H01M 4/8882; H01M 4/921; H01M 4/8657; H01M 8/0662; H01M 8/0668; B82Y 30/00; B82Y 40/00; C03C 17/00; C03C 2218/32; Y02E 60/50; B01J 37/082; B01J 37/349; B01J 37/0219; B01J 37/0018; B01J 37/18; B01J 21/08; B01J 23/38; B01J 23/89; B01J 23/892; B01J 23/464; B01J 23/52; B01J 35/0013; B01J 35/06; B01J 35/1057; B01D 53/944; B01D 53/94; B01D 2255/1025; B01D 2255/1021; B01D 2255/106; B01D 2255/20753

See application file for complete search history.

(56) References Cited

U.S. PATENT DOCUMENTS

2009/0148675 A1   6/2009  Sun
2010/0323884 A1*  12/2010 Roldan Cuenya et al. .... 502/339

FOREIGN PATENT DOCUMENTS

CN   101148710 A   3/2008
DE   19747813 A1   5/1999
(Continued)

OTHER PUBLICATIONS

English Language Abstract for CN 101148710, Mar. 26, 2008.
(Continued)

*Primary Examiner* — Brittany Raymond
(74) *Attorney, Agent, or Firm* — Caesar Rivise, PC

(57) ABSTRACT

The invention relates to a method for preparing a substrate surface structured with thermally stable metal alloy nanoparticles, which method comprises—providing a micellar solution of amphiphilic molecules such as organic diblock or multiblock copolymers in a suitable solvent; —loading the micelles of said micellar solution with metal ions of a first metal salt; —loading the micelles of said micellar solution with metal ions of at least one second metal salt; —depositing the metal ion-loaded micellar solution onto a substrate surface to form a (polymer) film comprising an ordered array of (polymer) domains; co-reducing the metal ions contained in the deposited domains of the (polymer) film by means of a plasma treatment to form an ordered array of nanoparticles consisting of an alloy of the metals used for loading the micelles on the substrate surface. The invention also provides a nanostructured substrate surface obtainable by said method as well as the use of said nanostructured substrate surface as a catalyst.

15 Claims, 6 Drawing Sheets

Figure 1:
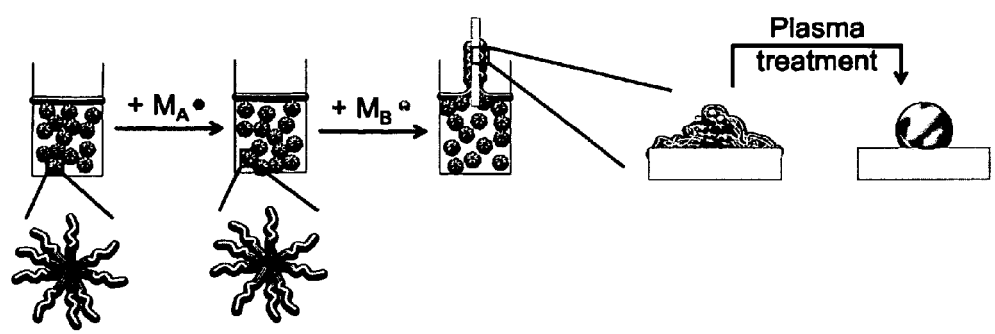

(51) Int. Cl.

| | | |
|---|---|---|
| *H01M 4/90* | (2006.01) | |
| *B01J 23/52* | (2006.01) | |
| *B01D 53/94* | (2006.01) | |
| *B01J 37/08* | (2006.01) | |
| *B01J 37/18* | (2006.01) | |
| *B01J 37/34* | (2006.01) | |
| *B01J 37/02* | (2006.01) | |
| *B01J 23/38* | (2006.01) | |
| *B01J 23/46* | (2006.01) | |
| *B01J 23/89* | (2006.01) | |
| *B01J 35/00* | (2006.01) | |
| *B01J 37/00* | (2006.01) | |
| *B82Y 30/00* | (2011.01) | |
| *B82Y 40/00* | (2011.01) | |
| *C03C 17/10* | (2006.01) | |
| *H01M 8/06* | (2016.01) | |
| *H01M 4/92* | (2006.01) | |
| *B01J 21/08* | (2006.01) | |
| *B01J 35/06* | (2006.01) | |
| *B01J 35/10* | (2006.01) | |

(52) U.S. Cl.
CPC ............... *B01J 23/89* (2013.01); *B01J 23/892* (2013.01); *B01J 35/0013* (2013.01); *B01J 37/0018* (2013.01); *B01J 37/0219* (2013.01); *B01J 37/082* (2013.01); *B01J 37/18* (2013.01); *B01J 37/349* (2013.01); *B82Y 30/00* (2013.01); *B82Y 40/00* (2013.01); *C03C 17/10* (2013.01); *H01M 4/8657* (2013.01); *H01M 4/8803* (2013.01); *H01M 4/8842* (2013.01); *H01M 4/8882* (2013.01); *H01M 4/9041* (2013.01); *H01M 4/921* (2013.01); *H01M 8/0662* (2013.01); *H01M 8/0668* (2013.01); *B01D 53/944* (2013.01); *B01D 2255/106* (2013.01); *B01D 2255/1021* (2013.01); *B01D 2255/1025* (2013.01); *B01D 2255/20753* (2013.01); *B01J 21/08* (2013.01); *B01J 35/06* (2013.01); *B01J 35/1057* (2013.01); *C03C 2218/32* (2013.01); *Y02E 60/50* (2013.01)

(56) References Cited

FOREIGN PATENT DOCUMENTS

| | | |
|---|---|---|
| DE | 19747815 A1 | 5/1999 |
| DE | 19843411 A1 | 3/2000 |
| DE | 19952018 C1 | 8/2001 |
| EP | 1027157 A2 | 8/2000 |
| EP | 2260995 A1 | 12/2010 |
| WO | 9921652 A2 | 5/1999 |
| WO | 0131402 A1 | 5/2001 |
| WO | 2006027274 A1 | 3/2006 |

OTHER PUBLICATIONS

English Language Abstract for DE 197 47 813 A1, May 6, 1999.
English Language Abstract for DE 197 47 815 A1, May 6, 1999.
International Search Report for PCT/EP2012/003210 dated Oct. 5, 2012.

* cited by examiner

SUBSTRATE SURFACE STRUCTURED WITH THERMALLY STABLE METAL ALLOY NANOPARTICLES, A METHOD FOR PREPARING THE SAME AND USES THEREOF, IN PARTICULAR AS A CATALYST

BACKGROUND

In view of the serious and world-wide increasing pollution of the environment by exhaust emissions of various origin, in particular car exhaust gases, increasingly more rigorous exhaust emission regulations have come into effect over the last decades. In order to comply with these regulations, a variety of catalytic converters for exhaust decontamination, particularly car exhaust decontamination, and fuel cells have been developed.

Since the availability of large catalytically active surfaces is a main issue for heterogenic catalysis, the catalytically active noble metals, such as Pt, Pd, Rh, in fuel cells and catalytic converters for car exhaust gases are usually provided on a washcoat consisting of inorganic oxides, typically $\gamma$-$Al_2O_3$. In order to achieve and maintain a high-performance catalyst, it is of crucial importance that said catalytically active noble metals are present in a highly disperse form.

The high temperatures occurring during the driving operation of cars can effect an irreversible agglomeration of the catalytically active nanoparticles by means of annealing processes. Thus, already at an operation temperature of 500° C. an increase of the cluster size of the catalytically active nanoparticles—which originally showed a nanodisperse distribution—can be observed. This effect is known as Ostwald Ripening. For example, the thermal aging of a platinum catalyst at temperature of e.g. above 700° C. results in a considerable increase of the mean particle size. The loss of dispersity may amount to more than 80% and, correspondingly, the catalyst may dramatically loose its activity.

Thus, an object of the present invention is to provide a substrate surface comprising disperse, thermally stable metal, preferably noble metal, nanoparticles suitable for use in catalysts, in particular for car exhaust decontamination and fuel cells, which catalysts are thermally stable, highly reactive and involve a very economical use of the costly noble metals.

This object is achieved by providing the method for preparing a nanostructured substrate surface and the use of said nanostructured substrate surface as a catalyst according to the invention.

DESCRIPTION OF THE INVENTION

The present invention provides a method for preparing a substrate surface structured with thermally stable metal alloy nanoparticles comprising
  providing a micellar solution of amphiphilic molecules in a suitable solvent;
  loading the micelles of said micellar solution with metal ions of a first metal salt;
  loading the micelles of said micellar solution with metal ions of at least one second metal salt;
  depositing the metal ion-loaded micellar solution onto a substrate surface to form a film comprising an ordered array of domains;
  co-reducing the metal ions contained in the deposited domains of the film by means of a plasma treatment to form an ordered array of nanoparticles consisting of an alloy of the metals used for loading the micelles on the substrate surface.

More specifically, the present invention provides a method for preparing a substrate surface structured with thermally stable metal alloy nanoparticles, which method comprises
  providing a micellar solution of an organic diblock or multiblock copolymer in a suitable solvent;
  loading the micelles of said micellar solution with metal ions of a first metal salt;
  loading the micelles of said micellar solution with metal ions of at least one second metal salt;
  depositing the metal ion-loaded micellar solution onto a substrate surface to form a polymer film comprising an ordered array of polymer domains;
  co-reducing the metal ions contained in the deposited domains of the polymer film by means of a plasma treatment to form an ordered array of nanoparticles consisting of an alloy of the metals used for loading the micelles on the substrate surface.

Principally, the material of the substrate surface is not especially limited and may be any material, in particular any material suitable for nanostructuring by micellar nanolithography. More specifically, the surface is selected from the group comprising metals, metal oxides, carbon and carbon-based materials, silica, glass, organic or inorganic polymers, ceramics. In particular, for high-temperature applications such as in catalytic converters for car exhaust emissions or in fuel cells, the surface has to be thermally stable in the temperature range of operation. For example, a substrate surface which is stable at temperatures above 450° C., preferably above 700° C., is used. More specifically, substrate surfaces known in the art for catalytic converters such as inorganic oxides, e.g. $Al_2O_3$, $SiO_2$, $TiO_2$, ZnO are suitable. In a preferred embodiment, a Si surface with a native oxide layer (hereafter referred to as Si/$SiO_x$) is used as the substrate surface.

The surface may be planar or curved, such as e.g. present in catalytic converters. In a specific embodiment of the invention, the surface consists of or comprises the surface of a colloid particle (microparticle) having a diameter in the micrometer range, such as 0.1-999 μm, more specifically 1-999 μm, preferably 5-900 μm. A suspension of such nanostructured colloid particles could be applied to an extended macroscopic surface/interface. In a further specific embodiment, the surface consists of or comprises the surface of fibers, in particular a mesh of fibers, wherein the fibers are made of, e.g., glass, $Al_xO_y$, $Fe_xO_y$, $Ti_xO_y$, carbon and other materials. In another specific embodiment, the substrate surface comprises or consists of mesoporous material, which material typically comprises particles or aggregates of particles, and the mesoporous material is preferably silica, alumina or silica/alumina.

The method for preparing a nanostructured substrate surface according to the invention comprises decorating the substrate surface with an ordered array of nanoparticles or nanoclusters by means of micellar nanolithography (BCLM). In this method, organic templates, e.g., block copolymers and graft copolymers that associate in suitable solvents to micellar core shell systems are used. These core shell structures serve to localize inorganic precursors from which inorganic particles with a controlled size can be deposited that are spatially separated from each other by the polymeric casing. The core shell systems or micelles can be applied as highly ordered monofilms on different substrates by simple deposition procedures such as spin casting or dip coating. The organic matrix is subsequently removed without residue by a gas-plasma process or by pyrolysis as a result of which inorganic nanoparticles are fixed on the substrate in the arrangement in which they were positioned by the organic template.

The size of the inorganic nanoparticles is determined by the weighed portion of a given inorganic precursor compound and the lateral distance between the particles through the structure, especially by the molecular weight of the organic matrix. As a result, the substrates have inorganic nanoclusters or nanoparticles, such as gold particles, in ordered periodic patterns corresponding to the respective core shell system used deposited on their surface.

The amphiphilic molecules may be any amphiphilic molecules known in the art, in particular amphiphilic molecules which are able to stabilize metal nanoparticles by forming a core-shell system (metal core enclosed by an organic shell).

More specifically, the amphiphilic molecules are selected from the group comprising compounds of the general formula R—X, with X being a polar or charged functional group, in particular COOH, OH, SH, NHR' (R' being alkyl), $NH_2$, PHR' (R' being alkyl), $PH_2$, P=O, $SO_2H$, $SO_3H$, $SO_4H$ and salts thereof, and R being a straight oder branched carbon chain with 5 or more C atoms, such as 6, 7, 8, 9, 10 or more carbon atoms, e.g. sodium dodecyl sulfate (SDS), trioctylphosphinoxide (TOPO), cetyltrimethylammoniumbromide (CTAB), tetradecyltrimethyl ammoniumbromide (TTAB), bifunctional compounds of the general formula Y—R—X, with X and Y, which are different, being a polar or charged functional group, in particular COOH, OH, SH, NHR' (R' being alkyl), $NH_2$, PHR' (R' being alkyl), $PH_2$, P=O, $SO_2$, $SO_3H$, $SO_4H$ and salts thereof, and R a straight oder branched carbon chain with 5 or more C atoms, preferably a bifunctional compound of the formula HS—R—X, dendrimers, in particular hydroxyl- and/or thiol-functionalized fourth generation polyamidodamine dendrimers (G4-PAMAM), organic diblock or multiblock copolymers, thiolated oligonucleotides and polyethylene glycols.

Some non-limiting examples for suitable block copolymers in this method are polystyrene-b-polyethylenoxide, polystyrene-b-poly(2-vinylpyridine), polystyrene-b-poly(4-vinylpyridine) or mixtures thereof. Preferably, polystyrene-b-poly(2-vinyl-pyridine) is used.

This basic micellar block copolymer nanolithography method is described in detail in, e.g., the following patents and patent applications: DE 199 52 018, DE 197 47 813, DE 297 47 815, and EP patent No. 1027157.

The method of the present invention represents an improvement over this prior art in that it enables to produce thermally stable metal alloy nanoparticles due to the modification of one or more essential steps of the known BCLM methods.

The term "thermally stable" as used herein means that the nanoparticles produced essentially remain immobilized on the surface. i.e. neither detach from the surface nor agglomerate, in a temperature range of at least up to 450° C., preferably at least 700° C., more preferred at least 750° C., such as 700-750° C. More specifically, the nanoparticles are thermally stable in the indicated ranges even in a humid atmosphere, including an acidic or basic humid atmosphere.

In the claimed method, the micelles are charged/loaded with at least two different metal ions and deposited, e.g. by means of dip coating. Subsequently, a co-reduction of the metal ions is effected by a plasma treatment. The gas plasma may be any plasma suitable to reduce the respective metal ions, in particular a plasma comprising at least one active component selected from the group of hydrogen, oxygen, nitrogen.

Preferably, the co-reduction of the metal ions is effected by means of a gas plasma comprising hydrogen. More specifically, the gas plasma is selected from the group consisting of pure hydrogen and a mixture of hydrogen/inert gas, in particular hydrogen/noble gas, such as hydrogen/argon. The hydrogen: inert gas ratio may be in the range from 1:99 to 99:1, preferably from 10:90 to 90:10, such as from 20:80 to 80:20.

In the method of the present invention, the plasma treatment is effected not only for reducing the metal ions and removing the organic component(s), such as polymer(s), but additionally also for fixing the resulting metal nanoparticles on the surface, for example by embedding the same into a native oxide layer. Therefore, the duration of the plasma treatment can be considerably longer that of plasma treatments of prior BCML methods. More specifically, the plasma treatment is effected for a time period of at least 60 minutes, preferably at least 70, 80 or 90 minutes, typically in a range of from 60-150 minutes, such as 60-120 minutes or 80-120 minutes. Typically, the plasma treatment is effected at reaction conditions of 0.1 to 1 mbar, such as about 0.4 mbar, reactive gas, and using a microwave plasma at 100-600 W.

The metal components of the metal alloy nanoparticles are not especially limited and may be any metal which is able to provide a stable metal alloy under the respective reaction and/or operation conditions. More specifically, the metals are selected from the group comprising noble metals, such as Au, Pt, Pd, Rh, Ag, and other metals, in particular catalytically active metals, e.g. transitions metals. Some non-limiting examples for catalytically active metals are In, Fe, Zr, Al, Co, Ni, Ga, Sn, Zn, Ti.

A wide variety of corresponding metal salts (e.g. as disclosed in WO 2008/116616) is available and can be used in the present invention. Some non-limiting examples are $HAuCl_4$, $MeAuCl_4$ (Me=alkali), $H_2PtCl_6$, other metal halides, $Pd(Ac)_2$, $Rh(Ac)_2$, $Ni(NO_3)_2$ etc.

In a preferred embodiment of the present invention, the first metal is Au or another noble metal, preferably Au or Rh, or Ni, and the at least one second metal is selected from noble metals, in particular from the group comprising Pt, Pd, Rh, preferably Pt, or transition metals, in particular Ni.

In the claimed method, the molar ratio of the first metal to the at least one second metal can be varied over a wide range and typically is in the range from 9:1 to 1:9, preferably in the range from 8:2 to 2:8.

Figure 5:
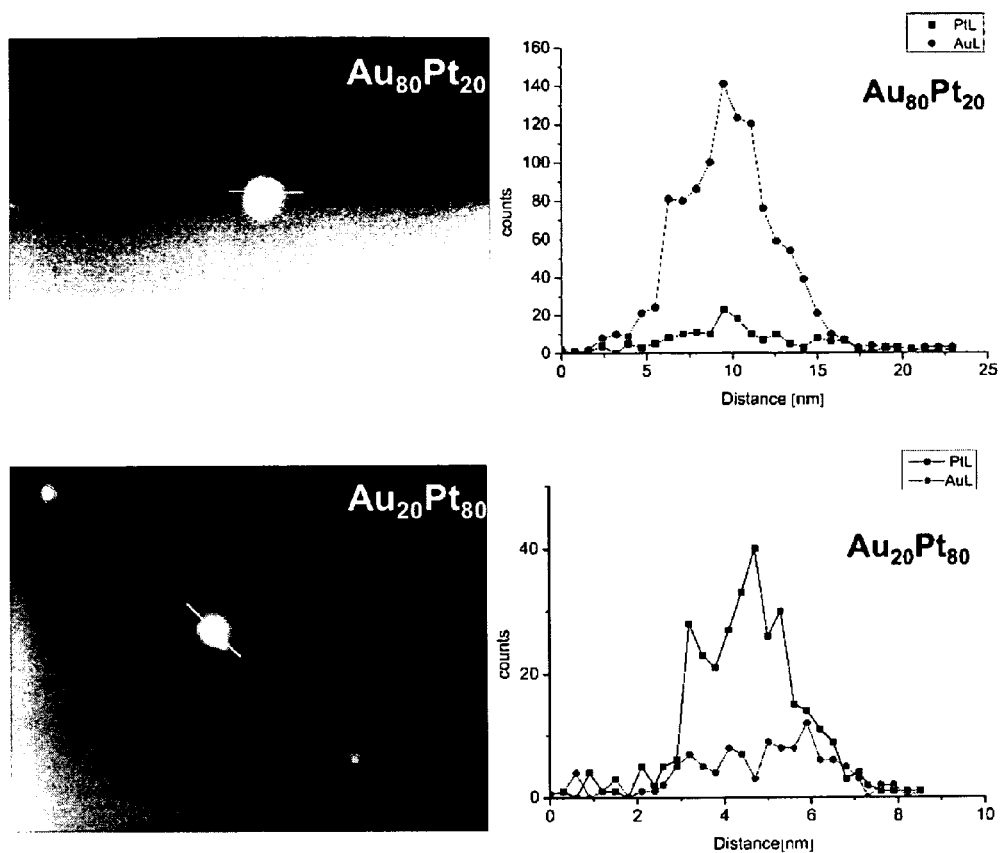

Surprisingly it has been found that even at molar ratios of 2 different metals which correspond to a miscibility gap of the respective bimetallic macroscopic solid at the operation temperature, the bimetallic nanoparticles obtained with the method of the present invention are largely resistant to segregation or aggregation. In FIG. 5, this finding is demonstrated for $Au_{80}Pt_{20}$ alloy particles and $Au_{20}Pt_{80}$ alloy particles. This favourable effect considerably extends the range of application, i.e. enables to obtain specific stable alloys which are not obtainable by conventional means, and represents an additional benefit of the claimed invention.

A closely related aspect of the present invention is the nanostructured surface comprising thermally stable metal alloy nanoparticles, in particular bimetallic nanoparticles, which is obtainable by the method outlined above.

The nanostructured surface of the invention comprising thermally stable metal alloy nanoparticles, in particular bimetallic nanoparticles, may be, e.g., advantageously used in catalytic applications.

Thus, a further aspect of the present invention relates to the use of said nanostructured surface as a catalyst, in particular a catalyst for treating/decontaminating car exhaust emissions or a catalyst for fuel cells.

More specifically, the catalyst catalyzes the oxidation of CO to $CO_2$ or the formation of water by reacting hydrogen and oxygen.

A further aspect of the present invention relates to a method for nanostructuring a substrate surface which is a bead or particle having a diameter in the micrometer range, mesoporous material, or a fibrous material, e.g. a fiber mesh, comprising a) providing a micellar solution of amphiphilic molecules as defined above, in particular molecules of an organic diblock or multiblock copolymer, in a suitable solvent and loading the micelles of said micellar solution with metal ions of at least one metal salt;

b) contacting the metal ion-loaded micellar solution with said beads, particles, mesoporous material or fibers by pressing said metal ion-loaded micellar solution through a layer of the beads, particles, mesoporous material, or fibers which is provided on a porous support without adhering to said support and subsequently drying the beads, particles, mesoporous material, or fibers, whereby a (polymer) film comprising an ordered array of (polymer) domains is formed on the surface of the beads, particles or fibers;

c) reducing the metal ions contained in the deposited domains of the (polymer) film, preferably by means of a plasma treatment to form an ordered array of nanoparticles on the bead, microparticle, mesoporous material or fiber substrate surface.

In a more specific embodiment of this method, using sequentially at least two different micellar solutions, steps a) and b) are repeated at least once with a salt of at least one second metal different from the first metal and step c) comprises a co-reduction of the different metal ions to form different metal nanoparticles on the same substrate surface.

In another specific embodiment of this method, in step a) micelles of one micellar solution are loaded/charged with a salt of a first metal and a salt of at least one second metal different from the first metal and step c) comprises a co-reduction of the different metal ions to form alloy nanoparticles, in particular bimetallic alloy nanoparticles.

Typically, the first metal in said alloy nanoparticles is a noble metal, preferably Au or Rh, or Ni, and the at least one second metal is selected from the group comprising noble metals, in particular Pt, Pd, Rh, preferably Pt, and transition metals, in particular Ni. More specifically, the alloy nanoparticles are Au/Pt nanoparticles, Rh/Pt nanoparticles or Ni/Pt nanoparticles.

Figure 6:
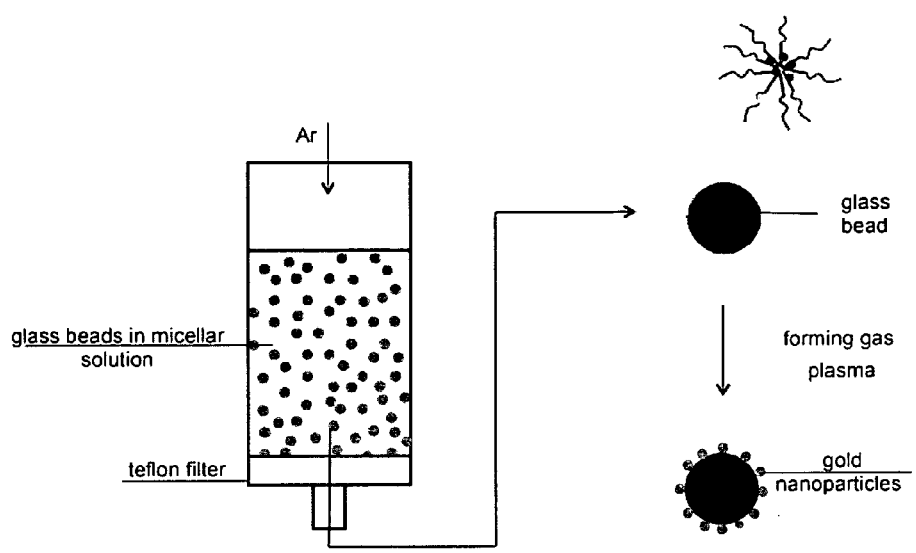

A general scheme for this method of coating and nanostructuring beads and (microcolloidal) particles is depicted in FIG. 6 and a specific embodiment thereof is described in more detail in Example 3.

Typically, the beads, microparticles, mesoporous material, or fibers are provided as a layer on a porous support without adhering thereto and a micellar polymer solution loaded with desired metal salt is pressed/forced through this layer, for example by means of an inert gas stream (e.g. applying a slight pressure or vaccuum). The porous support may be the frit of a chromatographic column or a component of any other suitable filtration system, e.g. a frit made of PTFE, glass or ceramic material. In specific embodiments, the beads, microparticles, mesoporous material or fibers may be contacted with a micellar polymer solution loaded with salts of 2 or more desired metals (resulting in alloy nanoparticles) or, alternatively, sequentially with 2 different micellar polymer solutions loaded with salts of different metals (resulting in two different kinds of nanoparticles on the same surface.

After drying the beads or microparticles coated with a micellar polymer film, preferably in an inert gas stream, the metal ions in the micelles are reduced or co-reduced, preferably by means of a gas plasma treatment similar to that described above and in Example 2 for extended surfaces.

Preferably, the gas plasma used is hydrogen or a mixture of hydrogen/inert gas, typically hydrogen/noble gas, such as hydrogen/argon or hydrogen/nitrogen, preferably in a mixing ratio as indicated above.

However, where appropriate, the reaction conditions may be adapted to the specific substrate surface. An optimization of the reaction conditions can be effected by a skilled artisan by means of routine experiments.

For example, in the case of mesoporous material or particles, in particular mesoporous particles consisting of $Al_2O_3$, $SiO_2$ oder a mixture thereof, the particles are preferably first mixed with the micellar solution of metal salt(s), ultrasonicated for 5 minutes, and subsequently filtrated in an argon stream and dried according to the above method. Subsequently, the mesoporous material or particles is/are subjected to a plasma treatment as described above.

The invention is further illustrating by the following non-limiting Examples and Figures.

FIGURES

FIG. 1. schematically illustrates the structuring of a substrate surface according to the method of the present invention.

Figure 2:
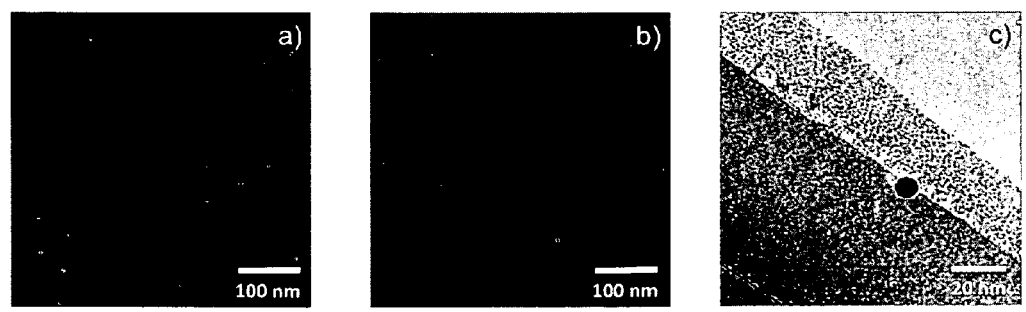

FIG. 2. shows SEM images of a substrate surface nanostructured with pure gold nanoparticles produced similar to the method of the present invention a) before an artificial aging step; and b) after the artificial aging step (7 h at 750° C. under atmospheric conditions); and c) a side view transmission electron micrograph of a Si-wafer after the artificial aging step and embedding it into epoxy and cutting the substrate perpendicular to its surface plane.

Figure 3:
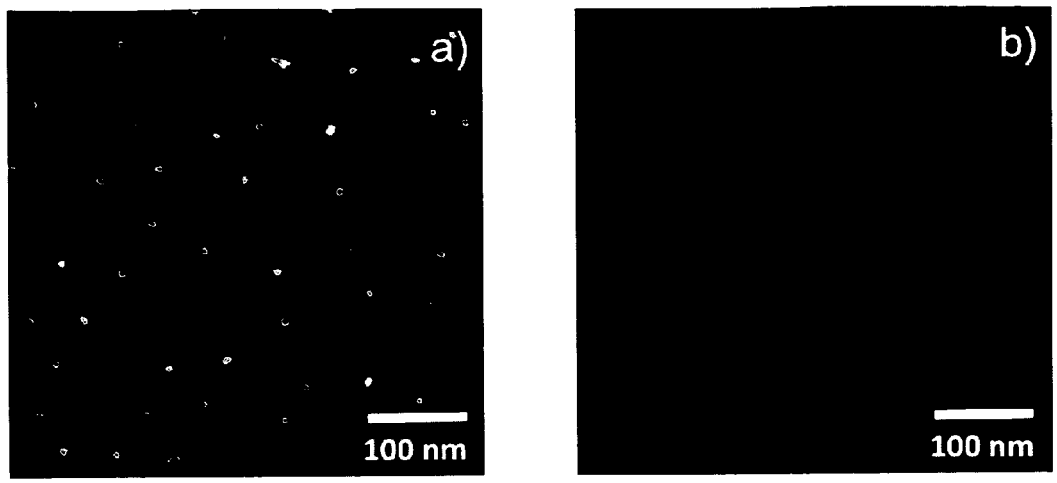

FIG. 3. shows SEM images of a substrate surface nanostructured with pure platinum nanoparticles produced similar to the method of the present invention a) before an artificial aging step; and b) after the artificial aging step (7 h at 750° C. under atmospheric conditions).

Figure 4:
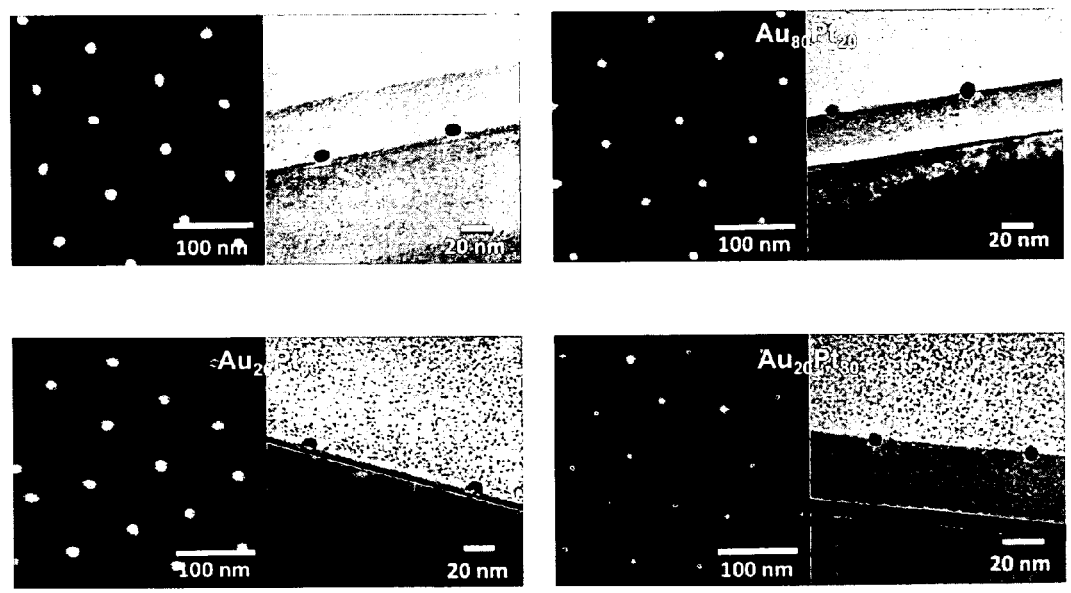

FIG. 4. shows SEM and corresponding TEM images of a substrate surface nanostructured with bimetallic gold/platinum nanoparticles ($Au_{80}Pt_{20}$ alloy particles upper row; $Au_{20}Pt_{80}$ alloy particles bottom row) produced according to the method of the present invention a) before an artificial aging step; and b) after the artificial aging step (7 h at 750° C. under atmospheric conditions)

FIG. 5. shows high-angle annular dark field (HAADF) TEM images (left) of the $Au_{80}Pt_{20}$ alloy particles (upper row) and $Au_{20}Pt_{80}$ alloy particles (bottom row) with corresponding HRTEM EDX spectra (right)

FIG. 6. schematically illustrates the structuring of a microcolloid particle surface according to the method of the present invention.

Figure 7:

FIG. 7. shows SEM images with different magnifications of microcolloid particles structured with gold nanoparticles.

Figure 8:
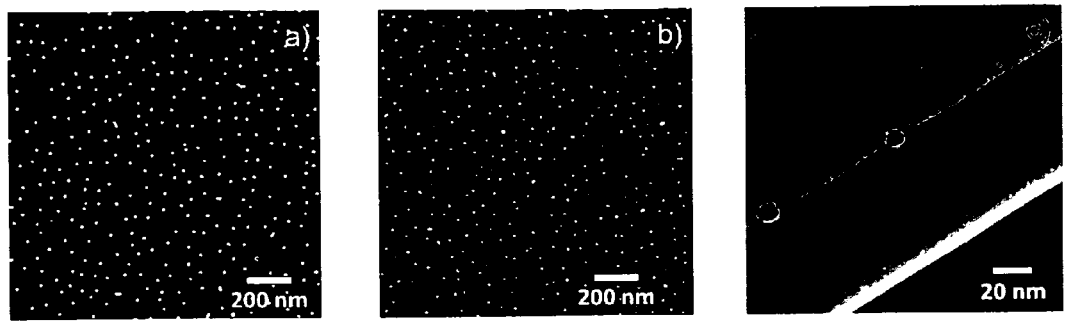

FIG. 8. shows SEM images of a substrate surface nanostructured with $Rh_{50}Pt_{50}$ nanoparticles produced according to the method of the present invention a) before an artificial aging step; and b) after the artificial aging step (7 h at 750° C. under atmospheric conditions); c) side view transmission electron micrograph of a Si-wafer after the artificial aging step and embedding it into epoxy and cutting the substrate perpendicular to its surface plane.

Figure 9:
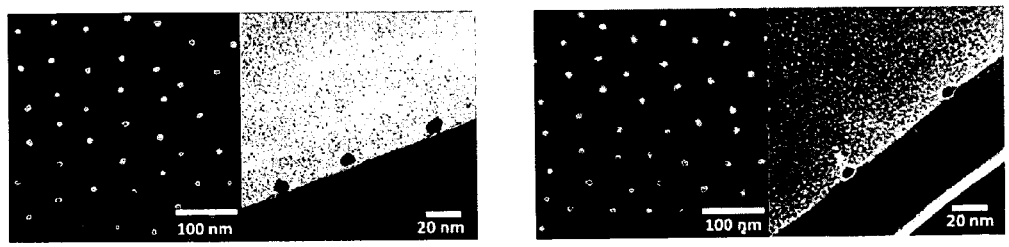
Figure 10:
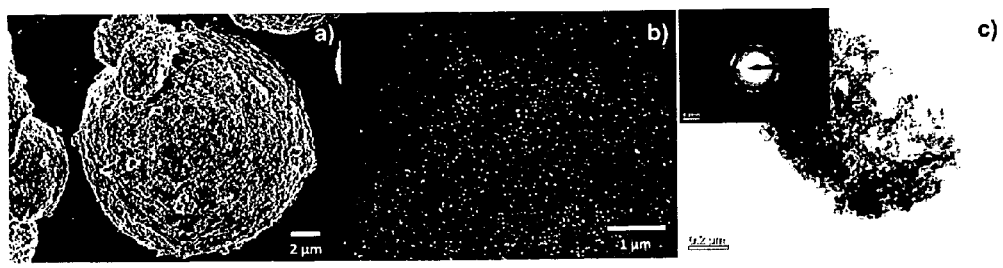

FIG. 9. shows SEM and corresponding TEM images of a substrate surface nanostructured with bimetallic $Ni_{50}Pt_{50}$ nanoparticles a) before an artificial aging step; and b) after the artificial aging step (7 h at 750° C. under atmospheric conditions) produced according to the method of the present invention FIG. 10. shows a) SEM, b) SEM-ESB, c) TEM and electron diffraction (inset to figure c) images with different magnifications of mesoporous alumina particles structured with $Au_{50}Pt_{50}$ nanoparticles.

Figure 11:
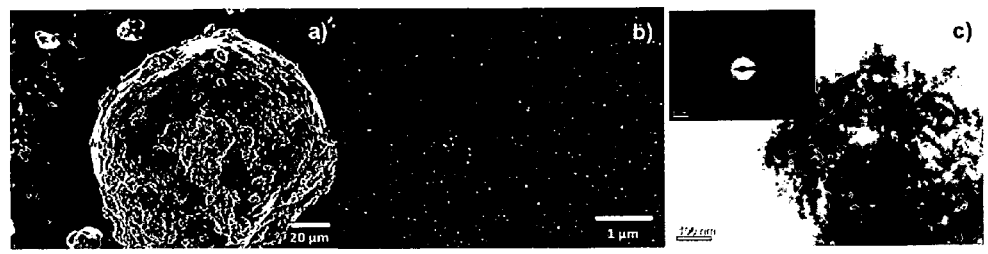

FIG. 11. shows a) SEM, b) SEM-ESB, c) TEM and electron diffraction (inset to figure c) images with different magnifications of mesoporous silica particles structured with $Au_{50}Pt_{50}$ nanoparticles.

Figure 12:

FIG. 12. shows a) SEM, b) SEM-ESB, c) TEM and electron diffraction (inset to figure c) images with different magnifications of mesoporous silica/alumina (60% $Al_2O_3$/40% $SiO_2$) particles structured with $Au_{50}Pt_{50}$ nanoparticles.

Figure 13:
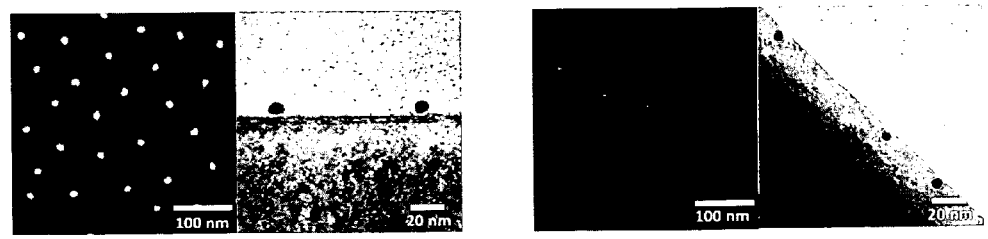

FIG. 13. shows SEM and corresponding TEM images of a substrate surface nanostructured with bimetallic $Au_{10}Pt_{90}$ nanoparticles a) before an artificial aging step; and b) after the artificial aging step (7 h at 750° C. under atmospheric conditions) produced according to the method of the present invention.

EXAMPLE 1

Preparation of Samples Nanostructured with Au/Pt Alloy Particles

The nanostructuring of the substrate was achieved by following a general working protocol which had been developed in the research group of the inventors.

The method for synthesizing the alloy particles is based on a BCML technique as outlined above and at least 2 different metal salts are used in varying ratios. The particle size is determined by the dimensions of the cells and the loading with the respective metal salts.

In an exemplary embodiment of the method of the present invention, micelles of PS(1056)-b-P2VP(495) in a desired concentration in toluene were prepared and loaded sequentially with $HAuCl_4$ and $H_2PtCl_6$ in varying ratios from 1:9 to 9:1. After loading the micelles with the first metal salt $HAuCl_4$, the solution was stirred for 24 h and subsequently the second metal salt $H_2PtCl_6$ was added. Following addition of said second metal salt, the solution was stirred for further 72 h.

After depositing the metal ion-loaded micelles on a Si/SiOx substrate surface by dipping the substrate into the micellar solution, and evaporation of the solvent by air drying, the substrate surface coated with a polymer film comprising metal ion-loaded micelles was subjected to a hydrogen plasma treatment with W10 gas (10% hydrogen, 90% argon) at 300-400 W und 0.1 to 0.5 mbar for a time period in the range from 90-150 minutes.

For the production of $Au_{80}Pt_{20}$-particles, micelles of PS(1056)-b-P2VP(495) in a concentration of 5 mg/ml in toluene were prepared, stirred for 24 hours and subsequently loaded with an amount of $HAuCl_4 \times 3H_2O$ calculated to obtain a micelle loading ratio of L=0.4, i.e., 4 of ten metal ion binding sites of the micelles were occupied with Au ions. After stirring for further 24 h, the micelles were loaded with the second metal salt $H_2PtCl_6$ in an amount calculated to obtain a micelle loading ratio of L=0.1. This procedure resulted in a total micelle loading ratio of about 0.5 and an Au:Pt ratio of 4:1. A silicon wafer (20×20 mm, p-doted), which had been exposed to Caro's acid for 24 h, subsequently rinsed with ultrapure water (Millipore) and treated for 15 minutes in an ultrasound bath, was dipped into the micellar solution and removed with a constant velocity (16 mm/min). After air-drying this substrate, the substrate surface coated with a polymer film comprising metal ion-loaded micelles was subjected to a hydrogen plasma treatment with W10 gas (10% hydrogen, 90% argon) at 350 W und 0.4 mbar for 120 minutes.

By this plasma treatment, a co-reduction of the metal ions was achieved, the polymer film was removed and the bimetallic nanoparticles produced in a quasi-hexagonal pattern on the surface were immobilized in the SiOx layer of the substrate surface.

EXAMPLE 2

Characterizing and Testing of Nanostructured Surfaces

Substrate surfaces nanostructured with different kinds of nanoparticles were prepared as detailed in Example 1 and subjected to an artificial aging process in order to simulate the high operation temperatures which occur in, e.g., catalytic converters for car exhaust emissions.

The artificial aging process was conducted as follows:

The sample was heated in a muffle furnace at 10° C./min under atmospheric gas up to the target temperature which was held for 7 hours. Thereafter the sample was allowed to cool off (no specific temperature gradient applied).

Silicon wafers are typically p-doted and conductive and can be directly observed without further processing (such as sputtering) in a SEM with an Inlens detector.

For TEM analysis, the samples are prepared accordingly. Specifically, the samples are cut (μm sections), in order to enable electron transmission through the samples. EDX measurements were conducted in a HRTEM (high-resolution TEM) with an EDAX detector. 30 measuring points were recorded per measurement.

FIGS. 2 and 3 demonstrate that pure gold particles immobilized on the substrate surface are thermally stable after 7 h at 750° C. under atmospheric conditions (FIG. 2) whereas pure platinum particles on the same kind of substrate show a considerable loss after the same aging treatment (FIG. 3).

FIG. 4 demonstrates that Au/Pt alloy particles of varying gold/platinum ratios, in particular $Au_{80}Pt_{20}$ and $Au_{20}Pt_{80}$, are thermally stable after 7 h at 750° C. under atmospheric conditions. In particular, the TEM images on the right row of panels a) and b), respectively, clearly demonstrate that the size of the particles remains essentially the same. FIG. 8 demonstrates a similar thermal stability for $Rh_{50}Pt_{50}$ nanoparticles prepared according to the method of the present invention. FIG. 9 demonstrates a similar thermal stability for $Ni_{50}Pt_{50}$ nanoparticles prepared according to the method of the present invention.

An undesirable effect which is often observed for bimetallic systems is the segregation of a specific alloy component and migration to the surface of the system. This effect, if any, in the present system is detectable by means of highly resolved transmission electron-microscopical energy-disperse X-ray measurements (HRTEM-EDX). As evident from FIG. 5 and Table 1, no significant segregation is observed for both $Au_{80}Pt_{20}$ and $Au_{20}Pt_{80}$ particles, notwithstanding the fact that these metals are known to have a segregation gap for the indicated mixing ratios and the temperature range of up to 750° C. in the macroscopic solid.

Table 1 below indicates the desired and actual particle composition of the bimetallic AuPt nanoparticles after the aging process.

TABLE 1

| Nanoparticle $A_{A\%}B_{B\%}$ | Atom % $(X_{A/B} \cdot 100)$ |
|---|---|
| $Au_{80}Pt_{20}$ | Au: 92 |
| | Pt: 8 |
| $Au_{20}Pt_{80}$ | Au: 21 |
| | Pt: 79 |

EXAMPLE 3

Coating of Microcolloids with the Method of the Invention

Microcolloidal particles have been coated and nanostructured according to the scheme depicted in FIG. 6.

Specifically, glass microspheres with varying diameters, typically in the range of from 10 to 100 μm, were immersed in Caro's acid for 24 h and, after repeated rinsing with MilliQ water and ultrasonication, dried. For coating the glass microspheres with metal nanoparticles, a column with a PTFE frit was loaded with the microspheres. Subsequently, the column was filled with a micellar polymer solution in toluene (or another suitable solvent) having a defined polymer concentration and loading of a desired metal salt. By applying an inert gas stream, such as argon, the metal salt micellar solution was pressed through the layer of glass microspheres using a slight excess pressure.

In a specific embodiment for nanostructuring the particle surface with gold nanoparticles, a micellar solution in toluene having a PS(1056)-b-P2VP(495) polymer concentration of 5 mg/ml was loaded with $HAuCl_4$ in a loading ratio of 0.5. In a second step, said micellar solution in toluene was pressed through the layer of glass microspheres by means of an argon stream.

Subsequently, the glass microspheres were dried in an argon stream. Finally, the glass microspheres coated with metal ion-loaded micelles were treated for 45 minutes (micelles loaded with $HAuCl_4$ to prepare gold nanoparticles) or 120 minutes (micelles loaded with $HAuCl_4$ and $H_2PtCl_6$ to prepare hybrid nanoparticles) with pure hydrogen plasma (150-400 W, preferably ca. 300 W, 0.4 mbar) or W10 gas (10% hydrogen, 90% argon) at 300 W und 0.4 mbar). The plasma treatment was effected with a plasma device Typ Femto 8 (with a rotating plasma chamber) available from Diener electronic GmbH&CoKG.

The invention claimed is:

1. A method for preparing a substrate surface structured with thermally stable metal alloy nanoparticles comprising
   providing a micellar solution of amphiphilic molecules in a suitable solvent;
   loading the micelles of said micellar solution with metal ions of a first metal salt;
   loading the micelles of said micellar solution with metal ions of at least one second metal salt;
   depositing the metal ion-loaded micellar solution onto a substrate surface to form a film comprising an ordered array of domains;
   co-reducing the metal ions contained in the deposited domains of the film by use of a plasma treatment, wherein the gas plasma is selected from the group consisting of pure hydrogen and a mixture of hydrogen and inert gas to form an ordered array of nanoparticles comprising an alloy of the metals used for loading the micelles on the substrate surface
   wherein the first metal is a noble metal, and the at least one second metal is a member selected from the group consisting of noble metals and transition metals, and wherein a molar ratio of the first metal to the at least one second metal is in a range from 9:1 to 1:9.

2. The method according to claim 1, wherein the amphiphilic molecules are selected from the group consisting of compounds of the general formula R—X, with X being a polar or charged functional group, and R being a straight or branched carbon chain with 5 or more C atoms, bifunctional compounds having the general formula Y—R—X, with X and Y, which are different, being a polar or charged functional group, and R being a straight or branched carbon chain with 5 or more C atoms, dendrimers, organic diblock or multiblock copolymers, thiolated oligonucleotides and polyethylene glycols.

3. The method according to claim 1, wherein the amphiphilic molecules are organic diblock or multiblock copolymers and the method comprises
   providing a micellar solution of an organic diblock or multiblock copolymer in a suitable solvent;
   loading the micelles of said micellar solution with metal ions of a first metal salt;
   loading the micelles of said micellar solution with metal ions of at least one second metal salt;
   depositing the metal ion-loaded micellar solution onto a substrate surface to form a polymer film comprising an ordered array of polymer domains;
   co-reducing the metal ions contained in the deposited domains of the polymer film by use of a plasma treatment to form an ordered array of nanoparticles comprising an alloy of the metals used for loading the micelles on the substrate surface.

4. The method according to claim 3, wherein the diblock or multiblock copolymer is selected from the group consisting of polystyrene-b-polyethylenoxide, polystyrene-b-poly(2-vinylpyridine), polystyrene-b-poly(4-vinyl-pyridine) and mixtures thereof.

5. The method according to claim 1, wherein the plasma treatment is effected for a time period of at least 60 minutes.

6. The method according to claim 1, wherein the nanoparticles are thermally stable up to a temperature at least 450° C.

7. The method according to claim 1, wherein the substrate surface is selected from the group consisting of Si, Si coated with a native oxide layer, $SiO_2$ glass, $TiO_2$, ZnO, alumina, silica/alumina, carbon and carbon-based materials.

8. A substrate surface comprising an array of thermally stable metal alloy nanoparticles obtainable with the method according to claim 1.

9. The substrate surface according to claim 8, wherein the metal alloy is an alloy of Au and Pt, an alloy of Rh and Pt, or an alloy of Ni and Pt.

10. The substrate surface according to claim 8, which is a bead or particle having a diameter in a micrometer range, a mesoporous material comprising particles or aggregates of particles, or a fibrous material.

11. The substrate surface according to claim 10, wherein the mesoporous material comprises silica, alumina or silica/alumina.

12. A method for catalyzing a reaction, said method comprising contacting reactants with the substrate surface according to claim 8.

13. The method according to claim 12, wherein the substrate surface is a catalyst for treating/decontaminating car exhaust emissions or a catalyst for fuel cells.

14. A method for nanostructuring a substrate surface which is a bead or particle having a diameter in a micrometer range, a mesoporous material comprising particles or aggregates of particles, or a fibrous material, comprising the steps:
  a) providing a micellar solution of amphiphilic molecules in a suitable solvent and loading the micelles of said micellar solution with metal ions of at least one metal salt;
  b) contacting the metal ion-loaded micellar solution with said beads, particles, mesoporous material or fibrous material by pressing said metal ion-loaded micellar solution through a layer of the beads, particles, mesoporous material or fibrous material which is provided on a porous support without adhering to said support and subsequently drying the beads, particles, mesoporous material or fibrous material, whereby a film comprising an ordered array of domains is formed on the surface of the beads, particles, mesoporous material or fibrous material; and
  c) reducing the metal ions contained in the deposited domains of the film to form an ordered array of nanoparticles on the bead, microparticle, mesoporous material or fibrous material substrate surface,
wherein in step a) the micelles are loaded with a salt of a first metal and a salt of at least one second metal different from the first metal and step c) comprises a co-reduction of different metal ions to form alloy nanoparticles, and wherein in said alloy nanoparticles the first metal is a noble metal, and the at least one second metal is a member selected from the group consisting of Pt, Pd, Rh and transition metals.

15. The method according to claim 14, wherein the alloy nanoparticles are Au/Pt nanoparticles, Rh/Pt nanoparticles or Ni/Pt nanoparticles.

* * * * *